United States Patent [19]

Schomburg

[11] 4,051,333

[45] Sept. 27, 1977

[54] TIP AND RING CONDUCTOR VOLTAGE TESTER

[75] Inventor: Richard A. Schomburg, Hillsboro, Oreg.

[73] Assignee: Communication Sciences Corporation, Hillsboro, Oreg.

[21] Appl. No.: 676,700

[22] Filed: Apr. 14, 1976

[51] Int. Cl.$^2$ .............................................. H04B 3/46
[52] U.S. Cl. .............................. 179/175.3 R; 324/133
[58] Field of Search .................... 179/175.3 R, 175; 324/133; 340/248 B, 248 C

[56] References Cited

U.S. PATENT DOCUMENTS

| | | | |
|---|---|---|---|
| 3,573,780 | 4/1971 | Butterbaugh | 179/175.3 R |
| 3,792,205 | 2/1974 | O'Dea | 179/175 |
| 3,805,155 | 4/1974 | Tsuda et al. | 324/133 |
| 3,903,471 | 9/1975 | Hiraga et al. | 324/133 |
| 3,962,630 | 6/1976 | Chaffee | 324/133 |

OTHER PUBLICATIONS

"Battery-Less Power Failure Alarm" by Tooker in *Popular Electronics* vol. 28, No. 2, Feb. 1968, pp. 43 and 44.
IBM Technical Disclosure Bulletin vol. 3, No. 6, Nov. 1960, p. 37, by O'Malley.

*Primary Examiner*—Douglas W. Olms
*Attorney, Agent, or Firm*—Christensen, O'Connor, Garrison & Havelka

[57] ABSTRACT

A circuit-energized voltage tester for determining whether or not the voltages on the tip and ring conductors of a telephone line are within their normal ranges is disclosed. The voltage tester is adapted for inclusion in a standard telephone repairman's handset and includes an energy storage circuit that becomes charged upon the application of handset test probes to tip and ring conductors if they are carrying a voltage greater than a predetermined level. Upon the closure of a switch, the energy thus stored energizes the remaining portion of the voltage tester. If suitable voltages are present on the tip and ring conductors, light emitting diodes forming a portion of a pair of optical isolators are controlled such that no measurement indication is provided. Specifically, the photo transistor portions of the optical isolators are alternately interrogated by a low frequency measurement control oscillator. The results of the interrogation control the generation of either high or low frequency tones produced by a single audio oscillator. The measurement control oscillator also controls the audio oscillator such that one tone may be generated when the first photo transistor is interrogated and the other tone may be generated when the second photo transistor is interrogated. The tones are only generated when the tip and ring voltages fall outside of their normal ranges. Thus, the absence of any tone indicates that both tip and ring voltages are in their normal ranges and the presence of one or both tones indicates that either one or both of the tip and ring voltages is outside of its normal range.

22 Claims, 3 Drawing Figures

TIP AND RING CONDUCTOR VOLTAGE TESTER

BACKGROUND OF THE INVENTION

This invention is directed to voltage testers and, more particularly, to voltage testers for testing whether or not the voltage on a conductor falls outside of its normal range.

During telephone installation and testing, it is often necessary to determine whether or not the voltages on the tip and ring conductors are within their normal ranges. Normally the tip conductor voltage lies in the range of from 0 to −24 volts and the ring conductor voltage lies in the range of from −24 to −48 volts, these values being respectively 50 and 100 percent of nominal central office battery voltage. While these voltage ranges are relatively wide, if the voltages on the tip and ring conductors fall outside of these ranges, telephone circuitry connected to these conductors will operate incorrectly, or not at all.

It will be readily appreciated that due to the multiplicity of wires involved in a telephone system, occasionally wires are incorrectly connected such that the voltages applied to the tip and ring conductors are reversed. Or, unintentional open circuit or grounding of the tip or ring conductors may occur. Thus, it is desirable to provide a device that rapidly and quickly determines whether or not the voltages carried by the tip and ring conductors fall within their normal ranges. While a volt meter can be used to determine this information, such an approach is undesirable for various reasons. The major disadvantage is the time required to connect up, adjust and read a volt meter. A potential alternative approach is to use an illuminated indicator, in combination with a go—no-go test circuit. However, illuminated indicators require the inclusion of power supplies which require replacement or recharging. Thus, it is desirable to provide a tip and ring conductor voltage tester that can utilize preexisting circuit voltages as a source of power, particularly one that can be housed in the test equipment normally utilized by the telephone installer or maintenance man (such as his handset), and that will rapidly and automatically provide an indication of whether or not the tip and ring voltages are within their normal ranges.

Therefore, it is an object of this invention to provide a voltage tester suitable for testing the voltage on a conductor to determine if it lies within a normal range.

It is also an object of this invention to provide a tip and ring conductor voltage tester.

It is a further object of this invention to provide a tip and ring conductor voltage tester suitable for installation in the handset normally utilized by telephone installation and maintenance personnel.

It is a still further object of this invention to provide a circuit-energized tip and ring voltage tester that automatically tests whether or not the voltages on both the tip and ring conductors of a telephone line are within their normal ranges.

SUMMARY OF THE INVENTION

In accordance with principles of this invention, a circuit-energized voltage tester for testing whether or not the voltages on the tip and ring conductors of a telephone line are within their normal ranges is provided. Preferably, the circuit-energized voltage tester is installed in a telephone lineman's handset so that it is automatically connected, via the probes of the handset, to the tip and ring conductors each time the handset is used. The voltage tester, in addition to an energy storage circuit, includes a two frequency audio oscillator controlled such that it generates a first tone if the tip voltage is outside of its normal range and a second tone if the ring voltage is outside of its normal range. A further low frequency measurement control oscillator selectively controls the testing of the tip and ring voltages in an automatic manner and the switching of the audio oscillator between its two frequencies of operation. If both the tip and ring voltages are outside of their normal ranges, both tones are heard in alternation. If however only one tone is heard, the related tip or ring voltage is indicated as lying outside of its normal range while the other voltage is indicated as lying within its normal range. Finally, if no tones are heard, both voltages fall within their normal ranges.

In accordance with further principles of this invention, optical isolators optically couple a measurement circuit connected to the probes of the lineman's handset to a control circuit. The light-emitting elements of the optical couplers are separately connected in parallel between the probes and ground, and are controlled such that if both the tip and ring voltages are within their normal ranges, a specific one of the two light-emitting elements is lit and the other is unlit. If this light emission relationship changes (i.e., both light emitting elements become lit, both go out or they reverse their normal lit/unlit states), an indication that either one or both of the tip and ring voltages lie outside of their normal ranges is provided. The light-receiving portions of the optical isolators are alternately interrogated by the output of the low frequency measurement control oscillator. The outputs are gated to the audio oscillator, which is also coupled to the control oscillator such that it is conditioned to produce the audio tone related to the photo transistor being interrogated, if the photo transistor detects that its related light emitting element is in the wrong state. Preferably, amplifying elements forming part of both the low frequency measurement control oscillator and the audio oscillator are types of operational amplifiers that which operate in the micro-power dissipation range. Thus, the requirement for low power consumption is met by presenting test results to the user by audible, rather than visual means and coordinating this with normal uses of the host equipment; e.g., a telephone handset.

It will be appreciated from the foregoing description that the invention provides an uncomplicated voltage tester suitable for testing whether or not the tip and ring voltages of telephone lines are within their normal ranges. The voltage tester provides a rapid, automatic indication and is suitable for inclusion in a standard telephone lineman's handset. Moreover, it does not require any replacable or externally rechargable batteries. In this regard, it has been found that the present invention, using a suitable capacitor in the energy storage circuit, will store power sufficient to test 20-30 dead lines once the capacitor becomes fully charged. Full charge is achieved within 10 seconds after the tester is first connected to a conductor pair with normal voltages present. In addition, the energy storage circuit will retain an adequate amount of energy for up to 12 hours after is has been fully charged.

BRIEF DESCRIPTION OF THE DRAWINGS

The foregoing objects and many of the attendant advantages of this invention will become more readily appreciated as the same becomes understood by reference to the following detailed description when taken in conjunction with the accompanying drawings wherein.

DESCRIPTION OF THE PREFERRED EMBODIMENT

Figure 1:
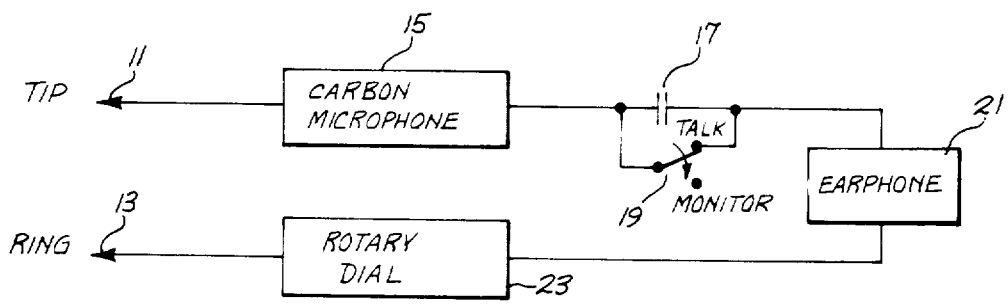
FIG. 1 is a basic block diagram of a standard telephone repairman's handset.

FIG. 1 is a block diagram illustrating a standard telephone repairman's handset and comprises: a tip probe 11 and a ring probe 13, suitable for connection to the tip and ring conductors of a telephone line; a carbon microphone 15; a capacitor 17; a single pole-double throw (SPDT) switch 19; an earphone 21; and, a rotary dial 23.

The tip probe 11 is connected to one side of the carbon microphone 15. The other side of the carbon microphone is connected to one terminal of the capacitor 17, and to the common terminal of the SPDT switch 19. The two remote terminals of the SPDT switch 19 are designated talk and monitor. The monitor terminal is unconnected and the talk terminal is connected to the other terminal of the capacitor 17, and to one side of the earphone 21. The other side of the earphone 21 is connected through the rotary dial 23 to the ring probe 13. As will be recognized by those skilled in the art from the following discussion, other detailed means of interconnection of these and other circuit elements are possible without affecting the applicability of this invention.

In a conventional manner, connection of the tip and ring probes to the tip and ring conductors of a telephone line allows a telephone repairman, installer or lineman, as the case may be, to monitor conversation signals of the telephone line, if the SPDT switch 19 is in its monitor position. In addition, the repairman can talk to other parties by placing the SPDT switch in its talk position. Also he can contact other parties using the rotary dial 23 (which could be replaced by a DTMF generator, i.e., a touch tone dial, if desired).

Figure 2:
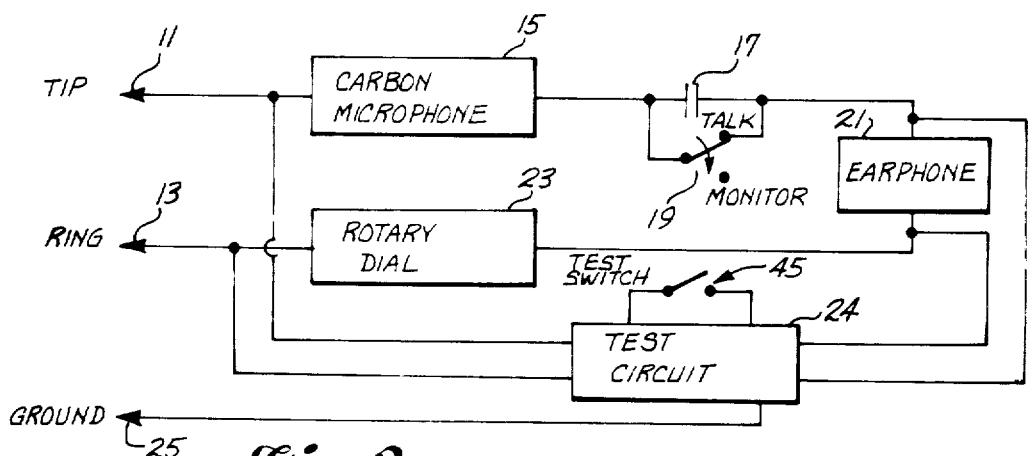
FIG. 2 is a block diagram of a telephone repairman's handset modified to include the present invention.

FIG. 2 illustrates a test circuit 24 formed in accordance with the invention connected to a telephne repairman3 s handset of the type illustrated in FIG. 1. Thus, FIG. 2 includes: the tip and ring probes 11 and 13; the carbon microphone 15; the capacitor 17; the SPDT switch 19; the earphone 21; and the rotary dial 23, all connected together in the manner illustrated in FIG. 1 and previously described. The test circuit 24 includes a test switch 45, plus a pair of input terminals connected to the tip and ring probes 11 and 13 and a pair of output terminals, one connected to one side and the other connected to the other side of the earphone 21. The test circuit also includes a ground terminal suitable for connection to a ground probe, or other form of ground connection device, 25.

Figure 3:
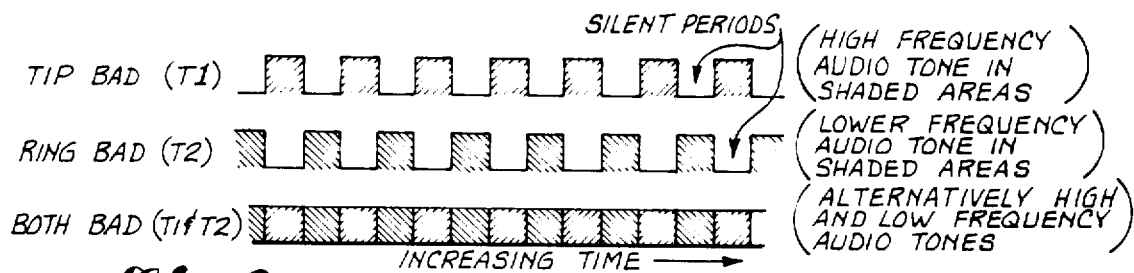
FIG. 3 is a wave form illustrating the generation of a pair of tones denoting whether or not the tip or ring voltages, or both, fall outside of their normal ranges; and, FIG. 4 is a schematic diagram of a preferred embodiment of a tip and ring conductor voltage tester formed in accordance with the invention.

In operation, when the handset is suitably connected, and test switch 45 is closed, the test circuit senses whether or not the voltages on the tip and ring conductors are in their normal ranges. If they are in their normal ranges, no signal is applied to the earphone 21. If, on the other hand, one or both of the voltages is outside of its normal range, one or both of two signals is applied. The signals are audio signals, one at a first frequency and the other at a second frequency. One of the signals denotes that the tip voltage is outside of its normal range and the other denotes that the ring voltage is outside of its normal range. The signals, if both exist, are alternately applied at a relatively low rate (such as, for example, four cycles per second) to the earphone 21. Thus, the existence of a single interrupted tone designates that the related conductor voltage is outside of its normal range and the presence of the other interrupted tone indicates that the voltage on the other conductor is outside of its normal range. The presence of both tones indicates that the voltages on both conductors are outside of their normal ranges, as illustrated in FIG. 3. (As will be recognized from the introductory portions of this application, "normal" relates to whether or not the related tip or ring conductor voltage is greater or less than, as the case may be, 50 percent of the central office battery voltage, which is typically −48 volts.)

Figure 4:
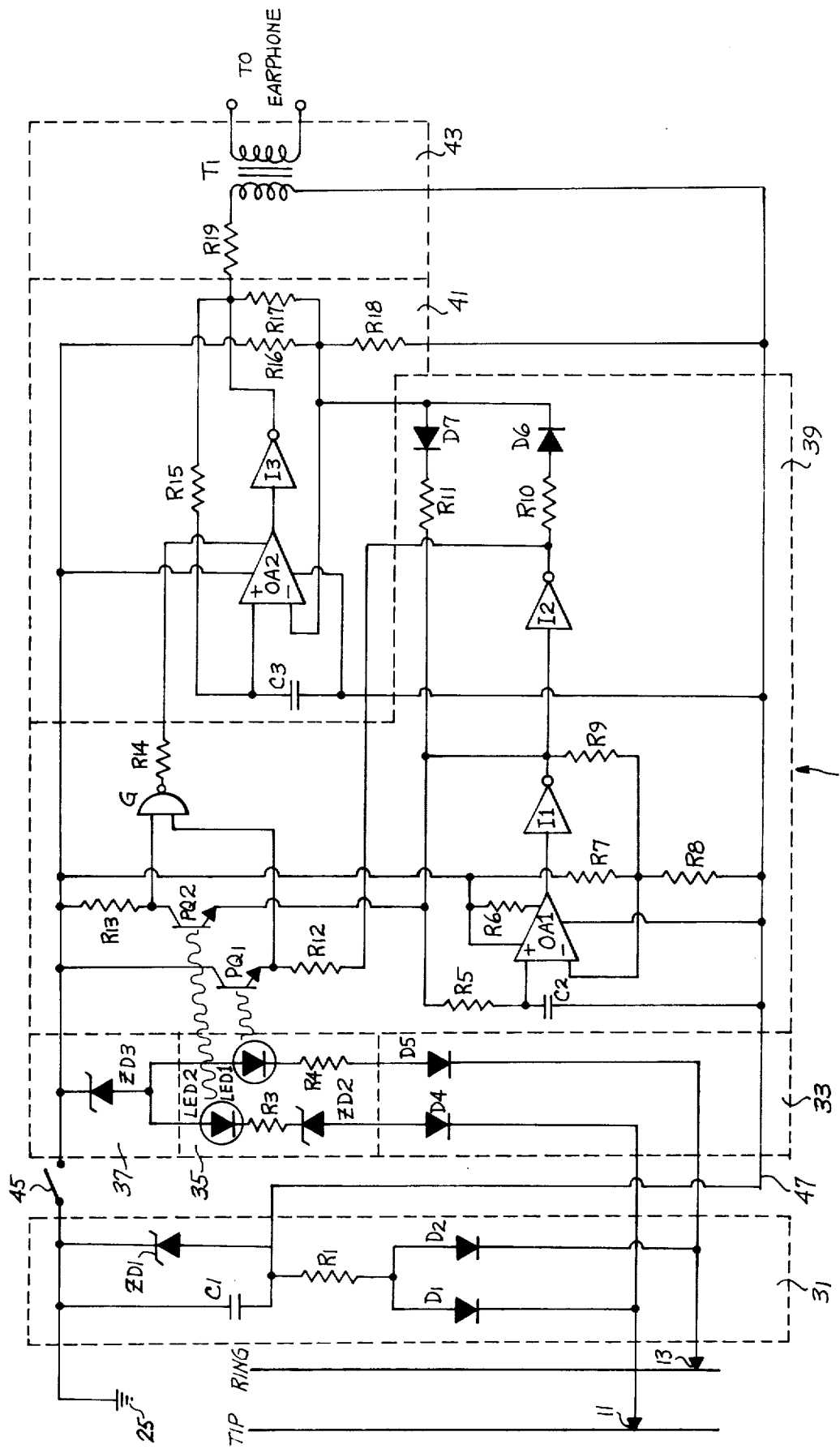

FIG. 4 is a schematic diagram of a preferred embodiment of a test circuit 24 formed in accordance with the invention and generally comprises: an energy storage and voltage limiting circuit 31; a protection circuit 33; a line voltage sensor and dead band control circuit 35; a voltage reference circuit 37; a control circuit 39; a dual tone audio generator 41; and, an output circuit 43.

The energy storage and voltage limiting circuit 31 comprises: a pair of diodes designated D1 and D2; a resistor designated R1; a capacitor designated C1; and, a zener diode designated ZD1. The cathode of D1 is connected to the tip probe 11 and the cathode of D2 is connected to the ring probe 13. The anodes of D1 and D2 are connected together and to one terminal of R1. The other terminal of R1 is connected through C1 to ground 25 and to the anode of ZD1. The cathode of ZD1 is connected to ground 25 and to a first terminal of a single pole, single throw (SPST) test switch 45. The junction between C1, ZD1 and R1 is connected to a power bus 47.

In operation, when the tip and ring probes 11 and 13 are connected to tip and ring conductor C at least one of which is carrying a voltage at or above a suitable minimal level, the capacitor C1 charges to that level, but not greater than the breakdown value of ZD1. For example, if the tip and ring voltages lie within their normal range of from 0 to −24 volts and from −24 to −48 volts, and ZD1 has a breakdown level of 15 volts, C1 will charge to a value of −15 volts. Preferably the circuit components (particularly R1) are chosen such that C1 will charge to its full charge value within a short period of time, such as 10 seconds, for example, if the tip and ring conductors are carrying voltages within their normal range. Further, since switch 45 is closed only to perform a test, the capacitor will remain charged to an adequate level for up to 12 non-use hours. And, after use on a circuit with typical voltages present, the capacitor charge will be adequate to operate the test circuit for 20-30 tests on dead tip and ring conductors if appropriate micropower active devices are chosen to make up the herein described test circuit. Further, while C1 normally charges to −15 volts in the illustrated embodiment, the following described subsystems will operate at lower voltages, down to −5 volts, for example.

The protection circuit 33 comprises a pair of diodes designated D4 and D5. The cathode of D4 is connected to the tip probe 11 and the cathode of D5 is connected to the ring probe 13.

The line voltage sensor and dead band circuit 35 comprises: a zener diode designated ZD2; two resistors designated R3 and R4; and, two light-emitting diodes designated LED1 and LED2. The anode of ZD2 is connected to the anode of D4. The cathode of ZD2 is connected through R3 to the cathode of LED2. The anode of D5 is connected through R4 to the cathode of LED1. LED1 and LED2 from the light-emitting portions of a pair of commercially available optical isolators. The phototransistors forming the other portions of the optical isolators form a portion of the control logic circuit 39 hereinafter described.

The reference circuit 37 comprises a single zener diode designated ZD3. The anode of ZD3 is connected to the anodes of LED1 and LED2. The cathode of ZD3 is connected to the second terminal of the SPST test switch 45.

The reference zener diode ZD3 provides a voltage reference for the light-emitting diodes LED1 and LED2. The voltage at a reference point, which is located at the junction between ZD3, LED1 and LED2, sets the decision value for the tip and ring voltage break point, e.g., −24 volts, when other diodes in the branch circuits are considered. When the voltages on the tip and ring conductors are within their normal ranges current will flow through LED1 but not through LED2. This is the basic operational criterion of the invention, hereinafter described, even though others could be used. This criterion is unaffected by the voltage on the storage capacitor, C1.

The protection circuit diodes D4 and D5 provide tip and ring sensor (LED) protection against reversed voltages. R3 and R4 limit current flow and ZD2 provides a dead band about the decision value (e.g., − 24 volts). The narrow band provided by the zener diode around the decision point allows the invention to be constructed such that no test tones will be produced by the voltage fluctuations that occur on a line in actual use, due to central office battery voltage differences and/or the effects of cable conductor resistance created by on-hook and off-hook conditions of the telephone instrument served by a cable-pair under test. Additionally, conversation and other signals on the tip and ring conductors cause voltage fluctuations. In the absence of the dead band provided by ZD2 these fluctuations could cause the production of erroneous tones. On the other hand, if a minimum dead band is desired, ZD2 may be eliminated.

The control circuit 39 comprises: an operational amplifier designated OA1; two photo transistors designated PQ1 and PQ2; a two-input NAND gate designated G; two inverters designated I1 and I2; two diodes designated D6 and D7; a capacitor designated C2; and, 10 resistors designated R5 − R14. The non-inverting input of OA1 is connected through C2 to the power bus 47. The negative power terminal of OA1 is connected to the power bus 47 and the positive power terminal is connected to the second terminal of the SPST switch 45. The enable terminal of OA1 is connected through R6 to the second terminal of the SPST switch 45. The output of OA1 is connected through I1 to the input of I2. The junction between I1 and I2 is connected through R5 to the non-inverting input of OA1 and through R9 to the inverting input of OA1. The inverting input of OA1 is also connected through R7 to the second terminal of the SPST switch 45 and through R8 to the power bus 47. The output of I2 is connected through R10 to the anode of D6. The cathode of D6 is connected to the anode of D7. The cathode of D7 is connected through R11 to the junction between I1 and I2.

The junction between I1 and I2 is connected to the emitter of PQ2. The collector of PQ2 is connected through R13 to the second terminal of the SPST switch 45. The junction between I2 and R10 is connected through R12 to the emitter of PQ1. The collector of PQ1 is connected to the second terminal of the SPST switch 45. PQ1 and PQ2 form the phototransistors of the optical isolators that include LED1 and LED2 as their light emitting elements. PQ1 is related to LED1 and PQ2 is related to LED2.

The collector of PQ2 is connected to one input of G and the emitter of PQ1 is connected to the other input of G. The output of G is connected to one end of R14.

OA1 in combination with I1 forms a low frequency measurement control square wave oscillator, energized when the SPST switch is closed. Preferably the frequency of the signal at the output of I1 is in the range of about 4Hz. R5 and C2 set the time constant of the oscillator circuit and, thus, control this frequency. R6 sets the amplifier power consumption. R7 and R8 set the bias point for the inverting input of OA1; and, R9 provides the feedback necessary for oscillation.

I2 inverts the output of the low frequency measurement control oscillator. Since the outputs of I1 and I2, which are complementary, are connected to the emitters of PQ2 and PQ1, respectively, these photo transistors are alternately enabled at the frequency of oscillation. R12 is an output current sense resistor for the tip test photo transistor (PQ2) and R13 is an output current sense resistor for the ring test photo transistor (PQ1).

When the output of I2 goes to a low state, if PQ1 is not conducting because it is not receiving light from LED1, the voltage on the emitter of PQ1 goes to a low (negative) state to denote a binary zero. Contrawise, if LED1 is lit when the output of I2 goes low the voltage on the emitter of PQ1 remains at a high (ground) state to denote a binary one. When the output of I1 goes to a low state, if PQ2 is not conducting because it is not receiving light from LED2, the voltage on the collector of PQ2 remains at a high (ground) state to denote a binary one. Again, contrawise, if LED2 is lit when the output of I1 goes low, the voltage on the collector of PQ2 goes to a low (negative) state to denote a binary zero. In accordance with normal NAND gate operation a binary zero on one or both of the inputs of G cause its output to go high (achieve a binary one state). This output enables the audio oscillator 41 in the manner hereinafter described.

In order to better understand how the optical isolator signals control the output of the NAND gate G, the following table is provided.

| LED 1 | LED 2 | OUTPUT OF G |
|---|---|---|
| LIT (1) | OUT (1) | LO (0) |
| OUT (0) | OUT (1) | HI (1) |
| LIT (1) | LIT (0) | HI (1) |
| OUT (0) | LIT (0) | HI (1) |

The first set of LED conditions occur when the tip and ring voltages lie within their normal ranges, and the others occur when one or both of these voltages lie outside of their normal ranges.

The oscillator 41 comprises: an operational amplifier designated OA2; an inverter designated I3; a capacitor designated C3; and, four resistors designated R15–R18. The positive power terminal of OA2 is connected to the second side of the SPST switch 45. The other terminal of R14 is connected to the enable input of OA2. The non-inverting input of OA2 is connected through C3 to the power bus 47. The negative power terminal of OA2 is also connected to power bus 47. The output of OA2 is connected to the input of I3. The output of I3 is connected through R15 to the non-inverting input of OA2 and through R17 to the inverting input of OA2. The inverting input of OA2 is also connected through R16 to the second terminal of the SPST switch 45. The inverting input is further connected through R18 to the power bus 47. The junction between D6 and D7 of the control circuit 39 is also connected to the inverting input of OA2.

The output of G controls the enabling of the audio oscillator. Specifically, any time the output of G achieves a binary one state, the oscillator is enabled. Whether the audio oscillator generates a low frequency tone or a high frequency tone depends upon the state of conduction of diodes D6 and D7. When the output of I2 is low and I1 is high (PQ1 being interrogated) the diodes D6 and D7 do not conduct, and thus permit the audio oscillator (if enabled by a binary one on the output of G) to produce a low frequency tone. Contrawise, when the output of I2 is high and I1 is low (PQ2 being interrogated) diodes D6 and D7 conduct and permit resistors R10 and R11 to appear in parallel respectively with resistors R16 and R18. This causes the audio oscillator (if enabled) to produce a high frequency tone. Thus, either or both tones can be produced, with each tone being related to a particular conductor, the existence of either tone indicating that the voltage on its related conductor is outside of its normal range.

In operation, R16 and R18 set the bias point for the audio oscillator and R17 provides feedback for oscillation. R11, R10, D6 and D7 form a frequency shift control. When the output of I2 is low and the ouput of I1 is high, corresponding to a ring test D6 and D7 are reverse biased and the low frequency tone is produced. This tone frequency is determined by the values of R15, C3, R16, R18 and R17, when OA2 is gated on by the output of G. The peak-to-peak voltage swing across C3 equals the output swing times the feedback ratio:

$$\frac{R16//R18}{(R16//R18) + R17}$$

where: $||$ means parallel value.

When the output of I2 is high and the output of I1 is low, D6 and D7 are forward biased and the high frequency tone is being generated. The frequency of the high frequency tone is determined by the values of R15, C3, R16, R18, R17, R10 and R11. R10 and R11, which are now effectively in parallel with R16 and R18, respectively, reduce peak-to-peak voltage swings across C3 and, thus, increase the audio frequency, since the time constant of R15/C4 remains fixed.

The coupling circuit 43 comprises: a resistor designated R19; and, a transformer designated T. The output of I3 is connected through R19 to one side of the primary winding of T. The other side of the primary winding is connected to the power bus 47. The secondary winding of T is connected to the earphone, as illustrated in FIG. 2. Resistor R19 sets the loudness of the oscillator tones as heard by the user of this invention.

In essence, the coupling circuit 43 couples the output of the oscillator 41 to the earphone via the transformer T, which also provides DC isolation between the oscillator and the earphone.

In summary, in a normal test situation, LED1 is lit and LED2 is out. In this situation, the output of G remains low during the entire cycle of operation of the low frequency measurement control oscillator and prevents the audio oscillator from oscillating. If both of the LED's are out, indicating that the ring conductor voltage is outside of its normal range, the output of G achieves a high state when the output of I2 achieves a low state causing a low frequency tone to occur. If both LED's are lit, indicating the tip conductor voltage is outside of its normal range, the output of G achieves a high state when the output of I1 achieves a low state, causing a high frequency tone to occur. In the final situation, when the reverse of the normal situation exists, i.e., LED2 is lit and LED1 is out, both high and low frequency tones occur at a low frequency alternation rate to indicate that both the tip and ring voltages are outside of their normal ranges.

While a preferred embodiment of the invention has been illustrated and described, it will be appreciated by those skilled in the art and others that various changes can be made therein without departing from the spirit and scope of the invention. For example, other types of audio oscillator gating techniques can be used, as well as other types of oscillators. Also, test switch 45 can be equipped with additional ganged contact sections to isolate the earphone from the telephone line under test, so to prevent the inadvertent application of measurement result tones to a busy telephone circuit. Hence, the invention can be practiced otherwise than as specifically described herein.

The embodiments of the invention in which an exclusive property or privilege is claimed are defined as follows:

1. A circuit-energized voltage tester for simultaneously testing a pair of related conductors of a telecommunication system to determine whether or not the voltages on said conductors are within their normal ranges, said circuit-energized voltage tester comprising:
   probe means for making a separate electrical connection to each conductor of a pair of related conductors;
   ground means for making a ground connection;
   energy storage means, connected to said probe means and to said ground means, for storing electrical energy derived from the power present on said conductors;
   sensing means, connected to said probe means, for sensing the voltage applied to said probe means by each conductor of said pair of conductors and providing first and second information signals related thereto, the nature of said first information signal being related to whether or not the voltage on one of said conductors is within its normal range and the nature of said second information signal being related to whether or not the voltage on the other of said conductors is within its normal range;
   interrogation means, connected to said energy storage means so as to be energized thereby, said interrogation means including: (i) detecting means for detecting said first and second information signals; and, (ii) enabling means for selectively producing enabling signals when the nature of either or both of said first and second information signals indicates that the voltage on their related conductor is outside of its normal range; and indicating means, connected: (i) to said energy storage means so as to be energized thereby; and (ii) to said interrogation means so as to receive said enabling signals, for producing an indication when an enabling signal is produced by said interrogation means, the nature of said indication denoting whether the voltage on one or both of said conductors are outside of their normal ranges.

2. A circuit-energized voltage tester as claimed in claim 1, wherein said sensing means includes a pair of light-emitting diodes, the lit/unlit state of said pair of light-emitting diodes forming said first and second information signals.

3. A circuit-energized voltage tester as claimed in claim 2, wherein said detecting means includes a pair of photo transistors, said pair of photo transistors being optically coupled to said light-emitting diodes on a one-to-one basis.

4. A circuit-energized voltage tester as claimed in claim 3 wherein said indicating means includes a micropower amplifier and feedback means suitable for causing oscillation in the audio frequency range.

5. A circuit-energized voltage tester for testing whether or not the voltages on the tip and ring conductors of a telephone line are within their normal ranges, said circuit-energized voltage tester comprising:

a first probe suitable for attachment to a ring conductor of a telephone line;

a second probe suitable for attachment to the tip conductor of a telephone line;

energy storage means, connected to said first and second probes, for storing energy obtained from the power carried by said tip and ring conductors;

sensing means, connected to said first and second probes, for producing a first two-state indication and a second two-state indication, the states of said first and second two-state indications being related, respectively, to whether or not the voltages on said tip and ring conductors lie within their normal ranges;

control means, connected to said energy storage means so as to be energized thereby, for providing enabling and tone control signals, said control means including: (a) detecting means for detecting the states of said first and second two-state indications produced by said sensing means and for producing an enabling signal if either state indication indicates that the voltage on its related tip and ring conductor is outside of its normal range; and, (b) a dual state control means for providing dual state control signals, said dual state control signals applied to said detecting means such that only one of said first and second two-state indications is interrogated at a time; and, dual tone audio oscillator means connected to said energy storage means so as to be energized thereby and, connected to said control means so as to be enabled by said enabling signal and so as to be conditioned by said dual state control means such said dual tone audio oscillator means is conditioned to produce one of the dual tones produceable by said dual tone audio oscillator means when one of said first and second two-state indications is interrogated and the other of said dual tones when the other of said first and second two-state indications is being interrogated, said tones only being produced if said dual tone audio oscillator means is enabled regardless of how it is conditioned.

6. A circuit-energized voltage tester as claimed in claim 5, wherein said sensing means includes first and second light-emitting diodes, one of said light-emitting diodes connected to said first probe and providing said first two-state indication and the other of said light-emitting diodes connected to said second probe and providing said second two-state indication, the lit/unlit state of said light-emitting diodes forming said two-state indications.

7. A circuit-energized voltage tester as claimed in claim 6, wherein said detecting means of said control means includes first and second photo transistors optically connected to said first and second light-emitting diodes, respectively, and adapted to be alternately interrogated by said dual state control means, said detecting means further including a two-input gate, the two inputs of said gate being connected to said photo transistor such that upon interrogation, the output of said gate produces an enabling signal if said photo detectors detect that the lit/unlit state of their related light-emitting diodes indicates that the voltage on the tip or ring conductor related to a respective light emitting diode is outside of its normal range.

8. A circuit-energized voltage tester as claimed in claim 7, wherein said dual state control means includes a low frequency oscillator adapted to alternately produce said dual state control signals.

9. A circuit-energized voltage tester as claimed in claim 8, wherein said low frequency oscillator includes a micropower operational amplifier.

10. A circuit-energized voltage tester as claimed in claim 9, wherein said dual tone audio oscillator means includes a micro-power operational amplifier and a feedback circuit connected thereto, at least one of the dual state control signals produced by said low frequency oscillator applied to said feedback circuit so as to control the frequency of oscillation of said dual tone frequency oscillator such that the frequency of oscillation relates to which of the first and second photo transistors is being interrogated.

11. In a telecommunication craftsman's hand set including a ground connector and first and second probes, and a microphone and an earphone for communication along the tip and ring conductors of a telecommunication line, the improvement comprising:

a test circuit suitable for inclusion in said telecommunication craftsman's hand set, said test circuit connected to said ground connector and said first and second probes for sensing the voltage on the tip and ring conductors of a telecommunication line when said pair of probes make electrical contact with a pair of tip and ri conductors, said test circuit including: (i) sensing and enabling means for sensing the level of the voltages on said tip and ring conductors applied to said test circuit by said first and second probes and producing enabling signals related thereto; and, (ii) audio means connected to said sensing and control means for producing a pair of dual tone audio electrical signals, one of said pair of dual tone audio electrical signals being produced if said enabling signals denote that the tip voltage is outside of its normal range and the other of said pair of dual tone audio electrical signals being produced if said enabling signals denote that the ring voltage is outside of its normal range, and both of said pair of dual tone audio electrical signals being produced if said enabling signals denote that both the tip and ring voltages are outside of their normal ranges, said test circuit being connected to said earphone such that said earphone audibly reproduces the audio electrical signals produced by said audio means.

12. The improvement claimed in claim 11, wherein:
A. said test circuit also includes energy storage means, connected to said ground connector and said first and second probes,
for storing energy obtained from the power carried by said tip and ring conductors;
B. said sensing and enabling means includes:
  1. sensing means, connected to said first and second probes, for producing a first two-state indication and a second two-state indication, the states of said first and second two-state indications being related, respectively, to whether or not the voltages on said tip and ring conductors lie within their normal ranges; and,
  2. control means, connected to said energy storage means so as to be energized thereby, for providing enabling and tone control signals, said control means including: (a) detecting means for interrogating said sensing means to determine the states of said first and second two-state indications produced by said sensing means and for producing an enabling signal if either state indication indicates that the voltage on its related tip and ring conductor is outside of its normal range; and, (b) a dual state control means for providing dual state control signals, said dual state control signals applied to said detecting means such that said detecting means determines the state of only one of said first and second two-state indications at a time; and,
C. said audio means includes a dual tone audio oscillator means connected to said energy storage means so as to be energized thereby and, connected to said control means so as to be enabled by said enabling signal and so as to be conditioned by said dual state control means such that said dual tone audio oscillator means is conditioned to produce one of the dual tones produceable by said dual tone audio oscillator means when the state of one of said first and second two-state indications is determined and the other of said dual tones when the other of said first and second two-state indications is being determined, said tones only being produced if said dual tone audio oscillator means is enabled regardless of how it is conditioned.

13. The improvement claimed in claim 12, wherein said sensing means includes first and second light-emitting diodes, one of said light-emitting diodes connected to said first probe and providing said first two-state indication and the other of said light-emitting diodes connected to said second probe and providing said second two-state indication, the lit/unlit state of said light-emitting diodes forming said two-state indications.

14. The improvement claimed in claim 13, wherein said detecting means of said control means includes first and second photo transistors optically connected to said first and second light-emitting diodes, respectively, and adapted to be alternately interrogated by said dual state control means, said detecting means further including a two-input gate, the two inputs of said gate being connected to said photo transistor such that upon interrogation, the output of said gate produces an enabling signal if said photo detectors detect that the lit/unlit state of their related light-emitting diodes indicates that the voltage on the tip or ring conductor related to a respective light emitting diode is outside of its normal range.

15. The improvement claimed in claim 14, wherein said dual state control means includes a low frequency oscillator adapted to alternately produce said dual state control signals.

16. The improvement claimed in claim 15, wherein said low frequency oscillator includes a micro-power operational amplifier.

17. The improvement claimed in claim 16, wherein said dual tone audio oscillator means includes a micro-power operational amplifier and a feedback circuit connected thereto, said low frequency oscillator applied to said feedback circuit so as to control the frequency of oscillation of said dual tone frequency oscillator such that the frequency of oscillation relates to which of the first and second photo transistors is being interrogated.

18. A voltage tester for simultaneously testing a related pair of tip and ring conductors of a telecommunication system to determine whether or not the voltages on said conductors are within their normal ranges, said voltage tester comprising:
probe means suitable for making a separate electrical contact with each conductor of said pair of related tip and ring conductors;
ground means for making a ground connection;
sensing means connected to said probe means and said ground means for sensing the voltage applied to said probe means by said pair of related tip and ring conductors and providing a pair of information signals whose natures relate to whether or not the voltages on said conductor are within or without their normal ranges;
interrogation means coupled to said sensing means for interrogating said sensing means so as to determine the nature of said information signals and for producing, in an alternating manner, a pair of enabling signals, one of said pair of enabling signals being produced if one of said information signals denotes that the voltage on the tip conductor is outside of its normal range and the other of said enabling signals being produced if the other of said information signals denotes that the voltage on the ring conductor is outside of its normal range; and,
audio means connected to said interrogation means for alternately producing a pair of different frequency audio electrical signals when enabling signals are produced by said interrogation means, one of said pair of audio electrical signals being related to and produced if said one of said pair of enabling signals is produced and the other of said pair of audio electrical signals being related to and produced if the other of said pair of enabling signals is produced.

19. A voltage tester as claimed in claim 18 wherein said sensing means includes a pair of light-emitting diodes, the lit/unlit state of said pair of light-emitting diodes creating said information signals denoting the state of the voltages on said pair of related tip and ring conductors.

20. A voltage tester as claimed in claim 19 wherein said interrogation means includes a pair of photo transistors, said pair of photo transistors being optically coupled to said pair of light-emitting diodes on a one-toone basis, said interrogation means further including a low frequency oscillator connected to said pair of photo transistors such that said photo transistors are alternatively enabled to interrogate their related light-emitting diodes.

21. A voltage tester as claimed in claim 20 wherein said indicating means is an audio amplifier.

22. A voltage tester as claimed in claim 21 wherein said audio amplifier is a dual frequency audio amplifier, said dual frequency audio amplifier being connected to said low frequency oscillator such that said dual frequency audio amplifier is conditioned to produce a first frequency signal when one of said photo transistors is enabled and a second frequency signal when the other of said photo transistors is enabled.

* * * * *